United States Patent
Tarikere et al.

(10) Patent No.: US 11,042,327 B1
(45) Date of Patent: Jun. 22, 2021

(54) IO OPERATION CLONING USING CHANGE INFORMATION SHARING WITH A STORAGE SYSTEM

(71) Applicant: EMC IP Holding Company LLC, Hopkinton, MA (US)

(72) Inventors: Madhu Tarikere, Bangalore (IN); Gopinath Marappan, Coimbatore (IN); Amit Pundalik Anchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/814,543

(22) Filed: Mar. 10, 2020

(51) Int. Cl.
*G06F 12/00* (2006.01)
*G06F 3/06* (2006.01)

(52) U.S. Cl.
CPC ............ *G06F 3/0659* (2013.01); *G06F 3/061* (2013.01); *G06F 3/067* (2013.01); *G06F 3/0647* (2013.01)

(58) Field of Classification Search
CPC .................................................. G06F 11/1451
See application file for complete search history.

(56) References Cited

U.S. PATENT DOCUMENTS

| | | | |
|---|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

PCT/US2019/052549, WO, Dec. 4, 2019, International Search Report and Written Opinion.

(Continued)

*Primary Examiner* — Yong J Choe
(74) *Attorney, Agent, or Firm* — Ryan, Mason & Lewis, LLP

(57) ABSTRACT

A host device is configured to obtain a write input-output operation and to determine that the write input-output operation corresponds to a source logical storage device of a storage system. The host device is configured to determine that the source logical storage device is being migrated to a target logical storage device and to generate change information based at least in part on the write input-output operation. The change information comprises an indication the source logical storage device that will be changed by a submission of the write input-output operation to the storage system. The host device is configured to submit the write input-output operation to the storage system and to provide the change information to the storage system. The change information is configured for use by the storage system to clone the source logical storage device changed by the submitted input-output operation to the target logical storage device.

20 Claims, 3 Drawing Sheets

(56) References Cited

U.S. PATENT DOCUMENTS

| | | |
|---|---|---|
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,400,611 B1 | 7/2016 | Raizen |
| 9,594,780 B1 | 3/2017 | Esposito et al. |
| 9,647,933 B1 | 5/2017 | Tawri et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,639 B2 | 12/2019 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0117766 A1 | 5/2013 | Bax et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |

OTHER PUBLICATIONS

PCT/US2019/053204, WO, Dec. 16, 2019, International Search Report and Written Opinion.

PCT/US2019/053473, WO, Dec. 19, 2019, International Search Report and Written Opinion.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

U.S. Appl. No. 15/795,653 filed in the name of Maneesh Pusalkar et al. on Oct. 27, 2017, and entitled "Storage System with Network-Wide Configurable Device Names."

U.S. Appl. No. 16/142,274 filed in the name of Sanjib Mallick et al. on Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. on Sep. 28, 2018, and entitled "Host Device with Multi-Path Layer Implementing Path Selection Based at Least in Part on Fabric Identifiers."

U.S. Appl. No. 16/155,429 filed in the name of Rimpesh Patel et al. on Oct. 9, 2018, and entitled "Categorizing Host IO Load Pattern and Communicating Categorization to Storage System."

U.S. Appl. No. 16/155,491 filed in the name of Kundan Kumar et al. on Oct. 9, 2018, and entitled "Migrating Control of a Multi-Path Logical Device from a Current MPIO Driver to a Target MPIO Driver."

U.S. Appl. No. 16/697,393 filed in the name of Vinay G. Rao et al. on Nov. 27, 2019, and entitled "Automated Seamless Migration of Logical Storage Devices."

U.S. Appl. No. 16/710,828 filed in the name of Amit Pundalik Anchi et al. on Dec. 11, 2019, and entitled "Automated Seamless Migration with Signature Issue Resolution."

IO OPERATION CLONING USING CHANGE INFORMATION SHARING WITH A STORAGE SYSTEM

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication where such IO operations may be cloned to both a source logical storage device and a target logical storage device by the host devices. However, such IO cloning during a migration in these and other contexts can be inefficient, consuming significant amounts of computational and network resources of the host device. Such conventional approaches to IO cloning can negatively impact the migration process and the servicing of other IO operations by the host devices which may thereby degrade overall system performance. Accordingly, a need exists for improved migration techniques that can avoid such drawbacks of conventional approaches.

SUMMARY

Illustrative embodiments provide techniques for IO operation cloning using change information sharing. For example, rather than cloning IO operations from the host device to both the source and target logical storage devices of the storage system during a migration, change information about at least a portion of the source logical storage device that has been changed by an IO operation submitted to the storage system during the migration may be provided to the storage system. The change information may then be used by the storage system to push or pull the changed portion of the source logical storage device to the target logical storage device.

Advantageously, illustrative embodiments can substantially reduce the amounts of host device computational and network resources that are consumed in performing IO cloning during a migration, relative to conventional migration approaches which rely on the cloning of IO operations from the host device to both the source logical storage device and the target logical storage device.

In one embodiment, an apparatus comprises a host device comprising a processor coupled to a memory. The host device is configured to communicate over a network with a storage system. The host device is further configured to obtain a write input-output operation for submission to the storage system and to determine that the write input-output operation corresponds to a source logical storage device of the storage system. The host device is further configured to determine that the source logical storage device is being migrated to a target logical storage device of the storage system and to generate change information based at least in part on the write input-output operation. The change information comprises an indication of at least a portion of the source logical storage device that will be changed by a submission of the write input-output operation to the storage system. The host device is further configured to submit the write input-output operation to the storage system and to provide the change information to the storage system. The provided change information is configured for use by the storage system to clone the at least a portion of the source logical storage device changed by the submitted input-output operation to the target logical storage device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
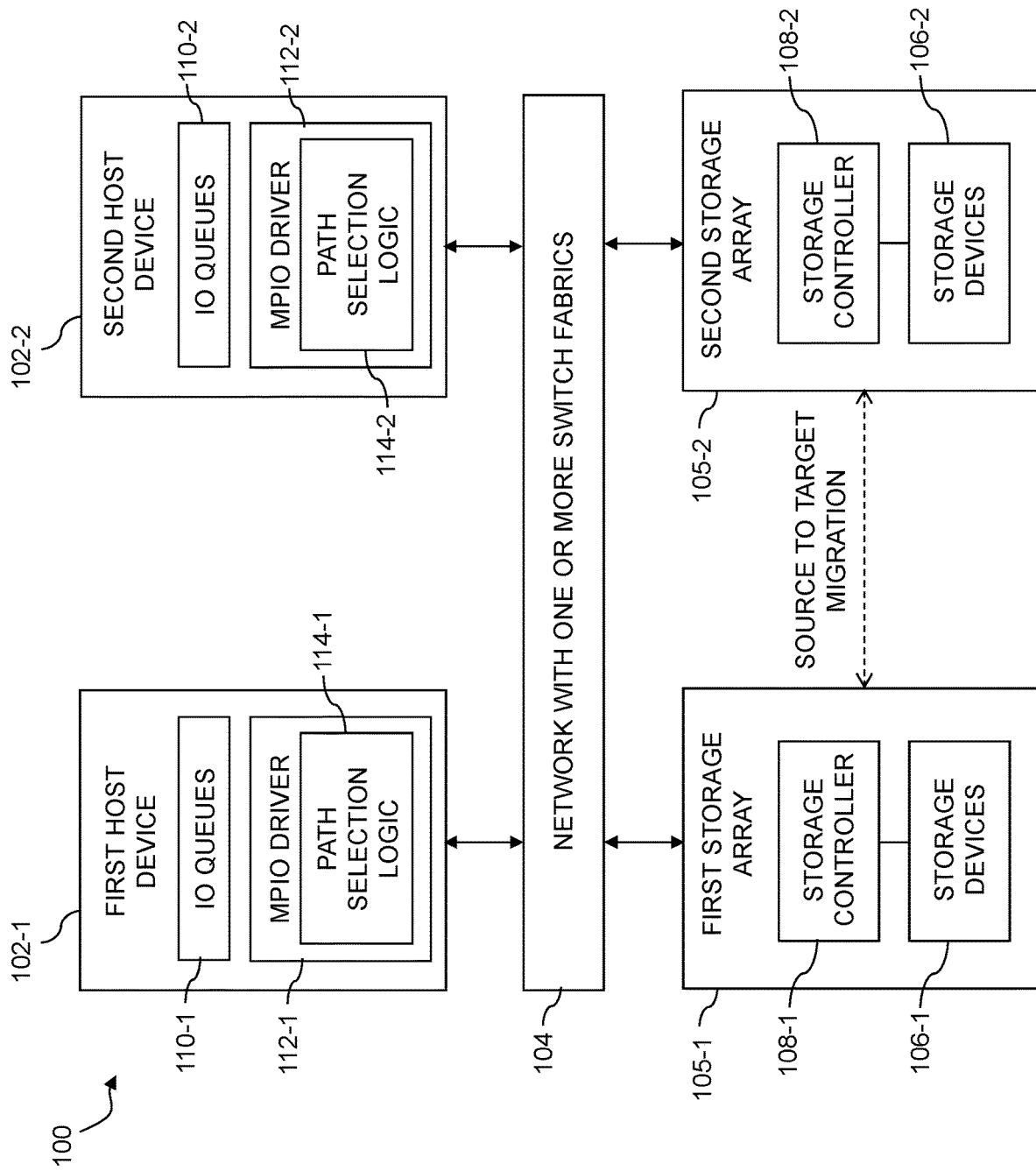
FIG. 1 is a block diagram of an information processing system configured with functionality for IO operation cloning using change information sharing in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAIVI), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation may comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for migration between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

In some embodiments, the multi-path layer additionally supports what is referred to herein as IO operation cloning using change information sharing. Such IO operation cloning functionality may be implemented at least in part in the multi-path layer, and may additionally or alternatively be implemented in migration control logic of the host devices 102 and storage arrays 105.

The MPIO drivers 112 may comprise, for example, otherwise conventional MPIO drivers, such as PowerPath® drivers from Dell EMC, suitably modified in the manner disclosed herein to support IO operation cloning using change information sharing. Other types of MPIO drivers from other driver vendors may be suitably modified to incorporate functionality for IO operation cloning using change information sharing as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also configured to implement at least portions of the IO cloning functionality of host device 102-1. Other host device components, such as migration control logic implemented in one or more host device processors, can additionally or alternatively implement aspects of the IO cloning functionality of the host device 102-1. The disclosed embodiments are therefore not limited to embodiments in which IO cloning functionality is controlled at least in part by an MPIO driver or multi-path layer.

As indicated previously, migration of logical storage volumes or other logical storage devices from one storage system to another storage system using conventional approaches can be problematic, particularly when the host device clones IO operations to both the source and target logical storage devices. For example, such IO cloning in these and other contexts can be inefficient, consuming significant amounts of computational and network resources of the host device. Such requirements of conventional approaches can negatively impact the migration process and the other processes of the host device and thereby degrade overall system performance.

Illustrative embodiments provide techniques for IO operation cloning using change information sharing. For example, some embodiments are configured to facilitate the cloning of IO operations during the migration of a source logical storage device to a target logical storage device in a particularly efficient manner that leverages the storage system migration resources for IO cloning rather than overburdening host device resources.

Migration of logical storage volumes or other logical storage devices from one storage system to another storage system using conventional approaches typically requires either close cooperation between a host administrator and a storage administrator, or "spoofing" of source logical storage device identifiers by corresponding target logical storage devices.

For example, some conventional host-based migration processes such as PowerPath® Migration Enabler (PPME) typically require that a host administrator and a storage administrator cooperate in setting up and executing the migration process, which in some circumstances can complicate the migration effort.

Storage-based migration processes such as Non-Destructive Migration (NDM) do not require such cooperation, but typically require device spoofing. More particularly, these storage-based migration processes typically require the target device to spoof the source device identifier or ID. This spoofing poses problems since the target device ID on the target array in some cases does not reflect the actual storage array on which the device resides. For example, if the storage array information is embedded in the device ID, and the target device is spoofing the source device by using the source device ID, the storage array information embedded in the spoofed device ID will indicate the source array and not the target array, even though the target device is located on the target array.

Host-based migration processes such as the above-noted PPME allow the target device to keep its own device ID, as an MPIO driver 112-1 of a multi-path layer can merge the two device IDs into a single device ID for presentation to a host device processor layer, thereby avoiding the problems associated with spoofing.

Once activated, the migration session can be utilized to carry out actual copying of data from the source logical storage device to the target logical storage device. The copying of data is also referred to herein as being performed as part of a migration process. Such a migration process can encompass, for example, the activated migration session in the host device 102-1, and possibly also a corresponding migration session activated in one or both of the first and second storage arrays 105, with the storage-side process illustratively configured for storage array based copying of data from the source logical storage device to the target logical storage device in a manner that avoids excessive consumption of host device resources. For example, the storage-side process may comprise a push or pull type migration process controlled by one of the storage arrays 105.

The host device 102-1 is further configured to terminate the activated migration session responsive to completion of the copying of the data of the source logical storage device to the target logical storage device. The source logical storage device can be deprecated or repurposed responsive to termination of the activated migration session.

As indicated above, activation of the migration session in the host device 102-1 causes a migration process to be performed in which data is copied from the source logical storage device to the target logical storage device.

The migration process can include, for example, a storage-based migration process in which the first storage array 105-1 controls the copying of the data from the first storage array 105-1 to the second storage array 105-2, illustratively with no significant involvement of the host device 102-1 in the migration process.

As another example, the migration process can include a host-based migration process in which one of the first storage array 105-1 and second storage array 105-2 controls the copying of the data from the first storage array 105-1 to the second storage array 105-2, but with significant involvement of the host device 102-1 in the migration process. For example, the MPIO driver 112-1 of the host device 102-1 can initiate the data copying.

Regardless of whether the storage-based migration process or the host-based migration process is used, the storage-side of the process typically involves the use of a native mechanism of the storage array to pull or push the data from the source logical storage device to the target logical storage device. For example, in the pull type migration, the storage array controlling the migration session, e.g., the storage array comprising the target logical storage device, acts as a control storage array for the migration session. As part of the pull type migration, data from the source logical storage device is pulled into target logical storage device by the control storage array. In the push type migration, the storage array controlling the migration session, e.g., the storage array comprising the source logical storage device, acts as the control storage array for the migration session. As part of the push type migration, data from the source logical storage device is pushed to the target logical storage device by the control storage array.

During the storage-side of the migration process, the control storage array typically does not have a way to identify IO operations that need to be cloned during the migration. Instead the cloning is performed by the MPIO driver 112-1 of the host device 102-1. In illustrative embodiments, techniques are disclosed that provide the capability for a control storage array to identify IO operations that need to be cloned during a push or pull type migration with the help of at least one of the host device MPIO driver 112-1 and a migration enabler such as, e.g., PPME.

The following steps are typically performed by a migration software on a storage array and a migration enabler on the host device to migrate data between a source logical storage device of a source storage array and a target logical storage device of a target storage array:

1. The migration enabler establishes a connection between the source storage array and the target storage array for the pull or push type migration.

2. On the host device, the migration enabler sets up the migration between the source logical storage device and the target logical storage device. For example, the migration enabler may select a migration type, e.g., pull or push, and identify the source and target logical storage devices.

3. The migration enabler initiates synchronization of the target logical storage device with the source logical storage device, e.g., instructs the control storage array to perform the migration. During synchronization, the host device MPIO driver is typically responsible for application IO cloning. For example, the host device MPIO driver submits write IO operations to the source logical storage device and clones the write IO operations by also submitting them to the target logical storage. Once the synchronization of the source logical storage device to target logical storage device is completed, a migration status on the host device is set to or remains at a source selected state, where both read and write IO operations are still performed using the source logical storage device.

4. The migration enabler designates the target logical storage device as the recipient of all IO operations. When this command completes successfully, the migration transitions to target selected state. While in the target selected state, the MPIO driver is still responsible for application IO operation cloning to both the source and target logical devices.

5. The migration enabler commits the migration to the target logical storage device. For example, as part of the commit operation, the MPIO driver may temporarily suspend the submission of IO operations while the target logical storage device completes any cloned IO operations and commits the migration. Once the commit command completes successfully, the source and target logical storage devices are no longer kept synchronized and IO operations are no longer sent to the source logical storage device by the MPIO driver.

6. Migration is now complete and the data on the source logical storage device may be cleaned up, e.g., through a garbage collection process.

Other types of migration processes involving at least one of the host devices 102-1 and the storage arrays 105 can be used in other embodiments.

Figure 3:
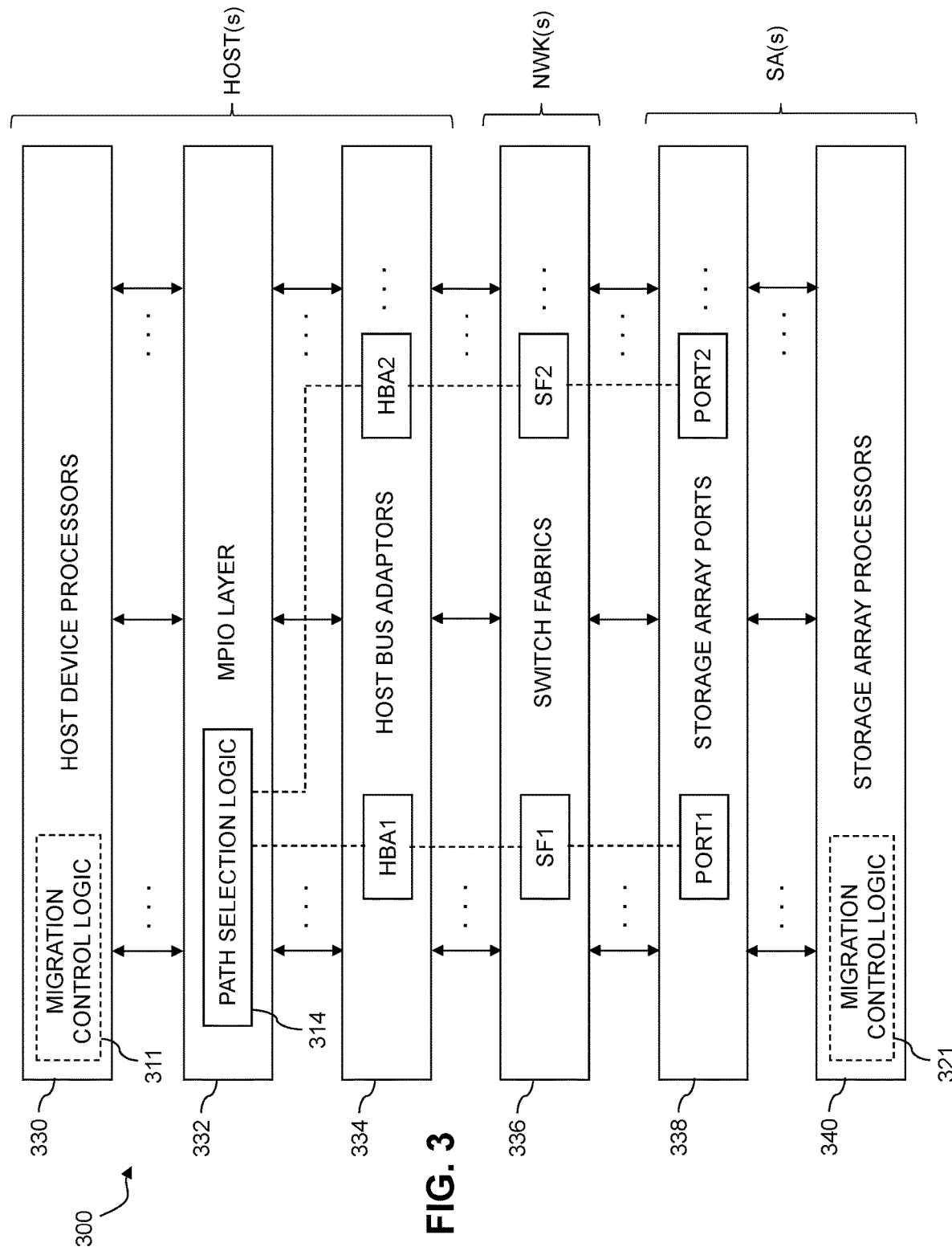
FIG. 3 is a block diagram showing multiple layers of a layered system architecture that are configured with functionality for IO operation cloning using change information sharing in an illustrative embodiment.

In an example architecture, the migration software which controls the migration resides only in the control storage array, e.g., as part of the migration control logic 321 (FIG. 3). Therefore, the migration software is not aware of incoming IO operations that are to be written to logical storage devices.

For example, in some example storage systems, the migration enabler residing on the host device is responsible for writing application IO operations to the source logical storage device first during a migration. Only if such a write succeeds, the migration software on the host device will clone the IO operations to target logical storage device, e.g., using the MPIO driver. The cloning of IO operations to the source logical storage device and the target logical storage device is serialized in this example.

In illustrative embodiments, the disclosed techniques offload the job of cloning write IO operations to the migration software of the control array during the push or pull type migration. For example, the migration enabler on the host device knows the source logical storage device and target logical storage device that are involved in a migration and provides this information to the MPIO driver. When the MPIO driver on the host device receives a write IO operation for the source logical storage device, the MPIO driver determines that the source logical storage device is involved in a migration. The MPIO driver then determines which data blocks are changed by the corresponding write IO operation and generates change information comprising a list of the data blocks that are being changed. In some embodiments, the change information may comprise a list of the data blocks that are being changed by more than one write IO operation.

The MPIO driver may send the change information comprising the list of changed blocks to the control storage array. For example, change information may be sent by the MPIO driver to the control storage array in conjunction with the submission of each write IO operation to the storage array comprising the source logical storage device, in conjunction with the submission of a predetermined number of write IO operations to the storage array comprising the source logical storage device, after a predetermined amount of time has elapsed since change information was last sent to the control storage array, periodically or according to any other threshold criterion that may be met.

The control storage array causes the blocks identified in the list of changed blocks to be copied from source logical storage device to the target logical storage device based at least in part on the change information.

In an example pull type migration, the control storage array is the storage array comprising the target logical storage device. The control storage array in this case receives the change information comprising a list of blocks that have been changed on the source logical storage device due to one or more write IO operations from the MPIO driver. The control storage array may then pull the blocks corresponding to the change information from the source logical storage device to the target logical storage device, even if those blocks were already migrated as part of the migration. In some cases, the blocks may be pulled after synchronization is complete. In some cases, if the migration has not yet pulled the blocks corresponding to the change information to the target logical storage device, the control storage array may disregard the change information and wait for the changed blocks to be pulled to the target storage logical device as part of the normal migration process.

In an example push type migration, the control storage array is the storage array comprising the source logical storage device. The control storage array in this case receives the change information comprising a list of blocks that have been changed on the source logical storage device due to one or more write IO operations from the MPIO driver. In some cases, the control storage array in the push type migration may alternatively generate the change information based at least in part on write IO operations received from the MPIO driver rather than receiving the change information from the MPIO driver. The control storage array may push the blocks corresponding to the change information from the source logical storage device to the target logical storage device, even if those blocks were already migrated as part of the migration. In some cases, the blocks may be pushed after synchronization is complete. In some cases, if the migration has not yet pushed the blocks corresponding to the change information to the target logical storage device, the control storage array may disregard the change information and wait for the changed blocks to be pushed to the target storage logical device as part of the normal migration process.

In this manner, there is no need for the host device MPIO driver to utilize processing and bandwidth resources to clone the IO operations to both the source and target logical storage devices since the control storage array will instead push or pull the data for any changed blocks from the source logical storage device to the target logical storage device as part of the storage-side of the migration process. This allows the MPIO driver to use these processing and bandwidth resources for processing additional IO operations, thereby increasing the efficiency of the information processing system as a whole.

The above-described functions associated with IO cloning functionality of the host device 102-1 are illustratively carried out at least in part utilizing the MPIO driver 112-1 and its path selection logic 114-1. For example, in some embodiments, the IO cloning functionality can be implemented substantially entirely under the control of the MPIO driver 112-1, and in such embodiments the path selection logic 114-1 is illustratively configured to control performance of the steps of the flow diagram to be described below in conjunction with FIG. 2. Additional or alternative host device components, such as migration control logic implemented in the host device or on the control storage array, can be used to control performance of an IO operation cloning process such as that of FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed IO operation cloning functionality. Accordingly, aspects of IO operation cloning functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support IO operation cloning using change information sharing.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of migration control logic implemented in the host devices 102 and the storage arrays 105 can be used to perform at least portions of the IO operation cloning functionality.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising one or more host devices and first and second storage systems. The first and second storage systems in this embodiment are assumed to comprise respective first and second storage arrays, possibly but not necessarily arranged in an active-active configuration, with each storage array comprising a plurality of storage devices. The storage devices of the first and second storage arrays are assumed to include logical storage devices such as LUNs or other logical storage volumes. The source and target logical storage devices of the IO operation cloning process shown in the figure are referred to as simply source and target devices in the following description.

Figure 2:
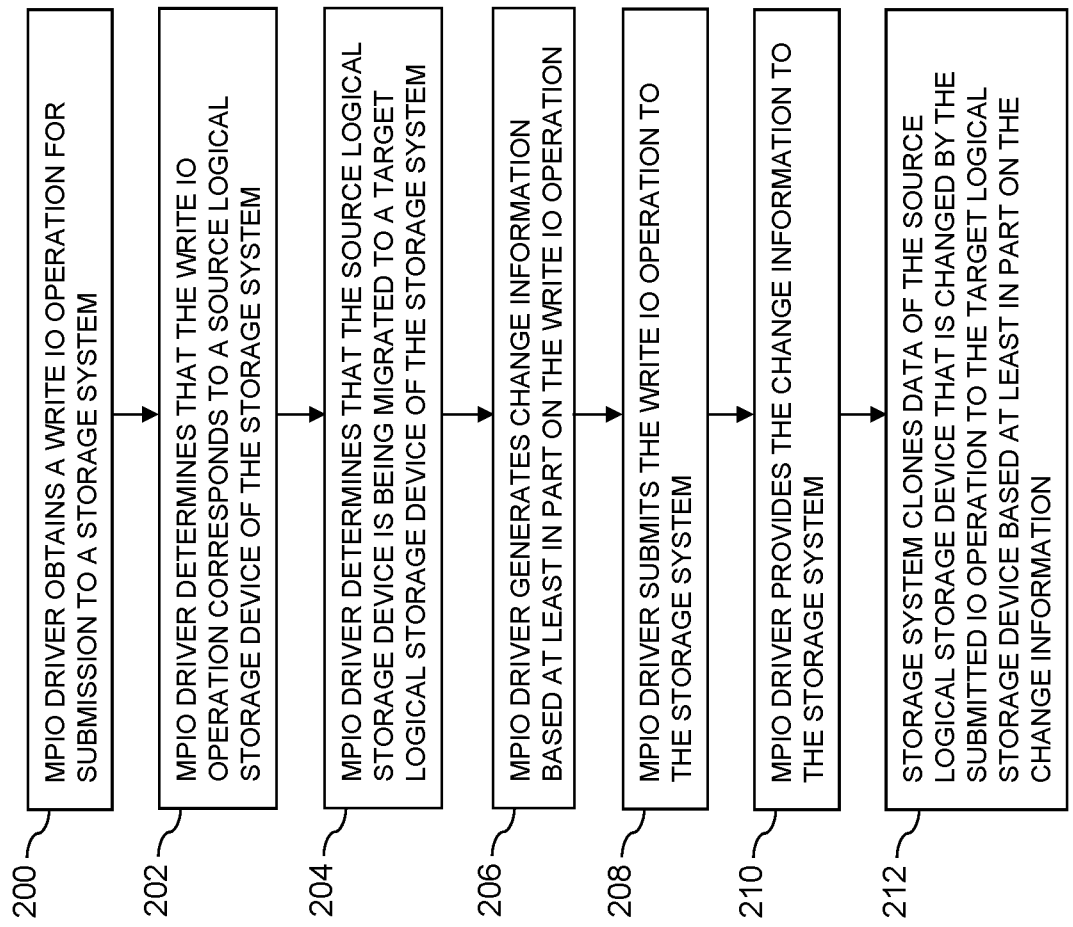
FIG. 2 is a flow diagram of a process for IO operation cloning using change information sharing in an illustrative embodiment.

The steps of the FIG. 2 process are illustratively performed primarily by or under the control of migration and multipath software of a given host device 102, such as, e.g., a migration enabler and MPIO driver 112-1 of the first host device 102-1 of system 100, and under control of migration software residing on one or both storage arrays 105, e.g., migration software residing on the control array for the migration, although other arrangements of system components can perform at least portions of one or more of the steps in other embodiments. The functionality of the FIG. 2 process is illustratively performed at least in part in conjunction with a load balancing algorithm or other type of path selection algorithm executed by the path selection logic 114-1 of the MPIO driver 112-1.

In step 200, the MPIO driver in the host device obtains a write IO operation for submission to the storage system.

In step 202, the MPIO driver determines that the write IO operation corresponds to a source logical storage device of the storage system.

In step 204, the MPIO driver determines that the source logical storage device is being migrated to a target logical storage device of the storage system.

In step 206, the MPIO driver generates change information based at least in part on the write IO operation. The change information comprises an indication of at least a portion of the source logical storage device that will be changed by a submission of the write IO operation to the storage system. For example, the change information may comprise a list of blocks to be changed by the write IO operation once submitted to the storage system, as described above.

In step 208, the MPIO driver submits the write IO operation to the storage system. For example, the write IO operation may be submitted to the storage array comprising the source logical storage device.

In step 210, the MPIO driver provides the change information to the storage system, for example, to the control storage array for the migration. For example, if the migration is a push type migration, the change information is provided to the storage array comprising the source logical storage device. In another example, if the migration is a pull type migration, the change information is provided to the storage array comprising the target logical storage device.

The provided change information is configured for use by the control storage array to clone the at least a portion of the source logical storage device changed by the submitted IO operation from the source logical storage device to the target logical storage device. For example, the control storage array may be configured to pull or push the data or blocks corresponding to the change information from the source logical storage device to the target logical storage device.

In step 212, the storage system clones the data of the source logical storage device that is changed by the submitted IO operation to the target logical storage device based at least in part on the change information, for example, as described above. For example, the control storage array may push or pull the data or blocks corresponding to the change information from the source logical storage array to the target logical storage array. In some embodiments, in a case where the data of the source logical storage device corresponding to the change information has not yet been migrated during the normal migration process, the control storage array may alternatively allow the data of the source logical storage device to be migrated as part of the normal migration process.

As an example, in step 212, the storage system, e.g., the control storage array, may receive the change information from the MPIO driver of the host device. The storage system may then determine whether or not the data corresponding to that change information, e.g., the at least a portion of the source logical storage device, has already been migrated from the source logical storage device to the target logical storage device. If the data has already been migrated, the storage system may initiate a further synchronization of the data or blocks as changed by the IO operation from the source logical storage device to the target logical storage device using the storage array-based migration software. On the other hand, if the data has not already been migrated, the storage system may determine that no further action is necessary based on this change information since the changed data will be migrated from the source logical storage device to the target logical storage device anyway as part of the ongoing migration process.

Although not explicitly indicated in the figure, the process at this point can return to step 200 to carry out one or more additional migration processes.

The steps of the FIG. 2 process are shown in sequential order for clarity and simplicity of illustration only, and certain steps can at least partially overlap with other steps. Also, one or more of the steps referred to as being performed by a particular system component, such as an MPIO driver, can in other embodiments be performed at least in part by one or more other system components.

As indicated above, different instances of the FIG. 2 process can execute at least in part in parallel with one another for different pairs of source and target devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and IO operation cloning functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different IO operation cloning arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Referring now to FIG. 3, another illustrative embodiment is shown. In this embodiment, an information processing system 300 comprises host-side migration control logic 311, path selection logic 314 and storage-side migration control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements IO operation cloning using change information sharing. The logical storage devices store data for one or more application processes running in one or more host device processors of the host device processor layer 330. The IO cloning functionality in this embodiment is assumed to be controlled at least in part by host-side migration control logic 311, path selection logic 314 of the MPIO layer 332, and storage-side migration control logic 321, although other arrangements are possible.

The host-side migration control logic 311 implemented in the host processor layer 330 controls host-based migration processes of the system 300. The migration control logic 311 can include multiple distinct migration control logic instances for respective ones of a plurality of host devices of the system 300.

The storage-side migration control logic 321 implemented in the storage array processor layer 340 controls storage-based migration processes of the system 300. The migration control logic 321 can include multiple distinct migration control logic instances for respective ones of a plurality of storage arrays of the system 300.

The host-side and storage-side migration control logic 311 and 321 are illustratively configured to implement at least portions of the functionality for IO operation cloning using change information sharing as disclosed herein. These components are shown in dashed outline in the figure, as they can be implemented in different locations within the system 300, or in a distributed manner across multiple locations. For example, the host-side migration control logic 311, although illustratively shown as part of the host processor layer 330, can be implemented at least in part in the MPIO layer 332. As another example, the storage-side migration control logic 321, although illustratively shown as part of the storage array processor layer 340, can be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. The path selection logic 314 in some embodiments operates in conjunction with the host-side and storage-side migration control logic 311 and 321 in implementing at least portions of the functionality for IO operation cloning using change information sharing as disclosed herein. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300 through their respective instances of migration control logic 311 or 321 provide functionality for IO cloning, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Another example of an IO cloning process implemented utilizing an MPIO layer such as MPIO layer 332 of the FIG. 3 embodiment will now be described in more detail. In this example, migration of a source logical storage device of a first storage array to a target logical storage device of a second storage array is provided along with IO cloning of incoming IO operations from the source logical storage device to the target logical storage device. The source and target logical storage devices are referred to as simply source and target devices in the following description. Similarly, the first and second storage arrays are also referred to as respective source and target arrays.

The process in the present example comprises an algorithm performed by one or more host device and the source and target arrays, with the one or more host devices illustratively utilizing their respective MPIO drivers to perform at least portions of the algorithm. In this example algorithm, the host device advantageously leverages storage array resources for data movement in conjunction with migration and IO cloning of a source device to a target device, rather than utilizing host-based data copying arrangements that can consume excessive amounts of host resources. The process includes the following steps:

1. One or more write IO operations are obtained by an MPIO driver of one of the host devices for submission to the source array.

2. The MPIO driver determines that the source device associated with the one or more write IO operations is involved in a migration, e.g., via the migration enabler.

3. Data such as, e.g., blocks, corresponding to the write IO operations are tracked by the MPIO driver, e.g., by generating change information about the data to be changed by submission of the write IO operation to the storage system. In some embodiments, the change information may be stored in a data structure on the host device. The change information may comprise, for example, an indication of which data will be changed due to submission of the IO operation to the storage system.

4. The MPIO driver sends the change information to the storage system, e.g., to the migration control logic 321 of the storage array controlling the migration, either with an in-band or out of band mechanism. In-band refers to utilizing the network and processing resources associated with servicing IO operations while out of band refers to utilizing separate network or processing resources from the in-band mechanism to communicate with the storage system. The change information may be sent according to any threshold criterion or periodic frequency such as those described above.

5. The migration control logic 321 receives the change information, reads the corresponding data from the source device and synchronizes the target device to the source device based on the read data. This eliminates the need for the MPIO driver to perform write IO operations to both the source and target devices as part of the cloning process which frees up processing and bandwidth between the host device and storage system for use in performing other operations or functions. As mentioned above, in some embodiments, if the migration has not yet copied the corresponding data, no further action by the migration control logic 321 based on the change information may be necessary since the data will be migrated as part of the normal migration process.

6. When migration control logic 321 completes the migration of the source device to the target device, the migration enabler ensures that the migration control logic 321 completes the cloning of all of the changed data before initiating a cutover to finalize the migration. This may be achieved, for example, by the migration enabler sending migration control logic 321 a synchronization complete request. Any new write IO operations received by the MPIO driver during the cutover will be suspended and processed for the target device only after completion of cutover.

While the disclosed IO cloning functionality applies to a pull or push migration, it may also be utilized by any migration that does not utilize host-based IO cloning techniques.

The disclosed IO cloning functionality improves the write throughput of applications during migration by removing the need for the MPIO driver of the host device to duplicate IO operations to both the source and target logical storage devices. For example, where previously IO operations would be written first to the source logical storage device and then to the target logical storage device, only one set of IO operations need be written using the disclosed IO functionality, i.e., to the source logical storage device. As a result, time needed to complete and acknowledge IO operations by the storage system is reduced since acknowledgment need only wait on one successful set of completed IO operations, e.g., only IO operations to the source logical storage device.

In addition, since the job of cloning IO operations is offloaded to the storage system migration control logic, the host device receives acknowledgement of the IO operation as soon as the IO operation is written to the source logical storage device thereby improving the performance. This allows the cloning of the data corresponding to the IO operation to the target logical device of the target array to be performed asynchronously to the IO operation in a different context in the background.

Another benefit is that the migration enabler and MPIO driver on the host device no longer need to perform the processing associated with the IO operation cloning, which frees up these resources for use in processing other host device functionality.

Finally, the use of the dedicated storage array connectivity between logical storage devices instead of the bandwidth between the storage array and the host devices to do both bulk copying and IO operation cloning and copying during migration provides additional reductions in the usage of the host device processing power and in-band communication mechanisms.

The process in the above example provides IO operation cloning using change information sharing, in a manner that avoids excessive usage of host device resources for cloning IO operations to both the source logical storage device and the target logical storage device. A similar process is assumed to be performed at least in part by any other MPIO drivers on any respective other host devices.

Again, the above process and other processes herein can utilize additional or alternative steps, and certain steps illustrated as being performed serially can instead be performed at least in part in parallel with one another.

Some embodiments include only a single host device, although multiple host devices are used in illustrative embodiments. For example, a single host device can be connected to two storage arrays that are arranged in an active-active configuration.

Also, it should be noted that the host devices in a given embodiment need not be in an active-active configuration. For example, multiple host devices can be arranged in a cluster and the host devices can be arranged in active-passive configurations, active-active configurations, or combinations thereof.

The particular IO cloning arrangements described above are presented by way of illustrative example only. Numerous alternative arrangements of these and other features can be used in implementing IO operation cloning using change information sharing in other embodiments.

The illustrative embodiments disclosed herein can provide a number of significant advantages relative to conventional arrangements. For example, some embodiments configure a host device and storage array to include functionality for IO operation cloning using change information sharing.

Such embodiments overcome the drawbacks of conventional approaches that consume significant amounts of computational and network resources of the host device and thereby degrade overall system performance.

For example, some embodiments disclosed herein are configured to facilitate IO cloning during the migration of a source logical storage device to a target logical storage device in a particularly efficient manner that intelligently leverages storage system resources rather than over-burdening host device resources.

Illustrative embodiments considerably facilitate data migration across storage arrays, leading to improved overall performance.

The disclosed functionality can be implemented using a wide variety of different storage arrays and other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, migration control logic and additional or alternative components. Also, the particular configurations of system and device elements and associated processing operations illustratively shown in the drawings can be varied in other embodiments. For example, a wide variety of different host device, MPIO driver and storage system configurations and associated automated seamless migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to a memory, the host device being configured to communicate over a network with a storage system, the host device being further configured:
to obtain a write input-output operation for submission to the storage system;
to determine that the write input-output operation corresponds to a source logical storage device of the storage system;
to determine that the source logical storage device is being migrated to a target logical storage device of the storage system;
to generate change information based at least in part on the write input-output operation, the change information comprising an indication of at least a portion of the source logical storage device to be changed by a submission of the write input-output operation to the storage system;
to submit the write input-output operation to the storage system; and
to provide the change information to the storage system, the provided change information being configured for use by the storage system to clone the at least a portion of the source logical storage device changed by the submitted input-output operation to the target logical storage device.

2. The apparatus of claim 1 wherein:
the storage system comprises a first storage array comprising the source logical storage device and a second storage array comprising the target logical storage device;
submitting the write input-output operation to the storage system comprises submitting the write input-output operation to the first storage array; and
providing the change information to the storage system comprises providing the change information to at least one of the first storage array and the second storage array.

3. The apparatus of claim 2 wherein providing the change information to the at least one of the first storage array and the second storage array comprises providing the change information to the first storage array, the provided change information being configured for use by the first storage array to clone the at least a portion of the source logical storage device changed by the submitted input-output operation to the target logical storage device, the cloning comprising pushing, by the first storage array, the at least a portion of the source logical storage device from the first storage array to the second storage array based at least in part on the provided change information.

4. The apparatus of claim 2 wherein providing the change information to the at least one of the first storage array and the second storage array comprises providing the change information to the second storage array, the provided change information being configured for use by the second storage array to clone the at least a portion of the source logical storage device changed by the submitted input-output operation to the target logical storage device, the cloning comprising pulling, by the second storage array, the at least a portion of the source logical storage device from the first storage array to the second storage array based at least in part on the provided change information.

5. The apparatus of claim 1 wherein:
generating the change information based at least in part on the write input-output operation comprises generating the change information based at least in part on a plurality of write input-output operations obtained by the host device;
submitting the write input-output operation to the storage system comprises submitting the plurality of write input-output operations to the storage system;

the host device is further configured to determine that a threshold criterion for providing the change information to the storage system has been met; and providing the change information to the storage system comprises providing the change information to the storage system based at least in part on the determination that the threshold criterion for providing the change information to the storage system has been met.

6. The apparatus of claim 1 wherein determining that the threshold criterion for providing the change information to the storage system has been met comprises determining that at least one of:

a threshold amount of time has elapsed since a prior submission of change information to the storage system; and a threshold number of write input-output operations have been submitted to the storage system since a prior submission of change information to the storage system.

7. The apparatus of claim 1 wherein the provided change information is configured for use by the storage system to clone the at least a portion of the source logical storage device changed by the submitted input-output operation to the target logical storage device based at least in part on a determination by the storage system that the source logical storage volume was already migrated to the target logical storage volume.

8. A method performed by a host device configured to communicate over a network with a storage system, comprising:

obtaining a write input-output operation for submission to the storage system;

determining that the write input-output operation corresponds to a source logical storage device of the storage system;

determining that the source logical storage device is being migrated to a target logical storage device of the storage system;

generating change information based at least in part on the write input-output operation, the change information comprising an indication of at least a portion of the source logical storage device to be changed by a submission of the write input-output operation to the storage system;

submitting the write input-output operation to the storage system; and providing the change information to the storage system, the provided change information being configured for use by the storage system to clone the at least a portion of the source logical storage device changed by the submitted input-output operation to the target logical storage device;

wherein the host device comprises a processor coupled to a memory.

9. The method of claim 8 wherein:

the storage system comprises a first storage array comprising the source logical storage device and a second storage array comprising the target logical storage device;

submitting the write input-output operation to the storage system comprises submitting the write input-output operation to the first storage array; and providing the change information to the storage system comprises providing the change information to at least one of the first storage array and the second storage array.

10. The method of claim 9 wherein providing the change information to the at least one of the first storage array and the second storage array comprises providing the change information to the first storage array, the provided change information being configured for use by the first storage array to clone the at least a portion of the source logical storage device changed by the submitted input-output operation to the target logical storage device, the cloning comprising pushing, by the first storage array, the at least a portion of the source logical storage device from the first storage array to the second storage array based at least in part on the provided change information.

11. The method of claim 9 wherein providing the change information to the at least one of the first storage array and the second storage array comprises providing the change information to the second storage array, the provided change information being configured for use by the second storage array to clone the at least a portion of the source logical storage device changed by the submitted input-output operation to the target logical storage device, the cloning comprising pulling, by the second storage array, the at least a portion of the source logical storage device from the first storage array to the second storage array based at least in part on the provided change information.

12. The method of claim 8 wherein:

generating the change information based at least in part on the write input-output operation comprises generating the change information based at least in part on a plurality of write input-output operations obtained by the host device;

submitting the write input-output operation to the storage system comprises submitting the plurality of write input-output operations to the storage system;

the method further comprises determining that a threshold criterion for providing the change information to the storage system has been met; and providing the change information to the storage system comprises providing the change information to the storage system based at least in part on the determination that the threshold criterion for providing the change information to the storage system has been met.

13. The method of claim 8 wherein determining that the threshold criterion for providing the change information to the storage system has been met comprises determining that at least one of:

a threshold amount of time has elapsed since a prior submission of change information to the storage system; and a threshold number of write input-output operations have been submitted to the storage system since a prior submission of change information to the storage system.

14. The method of claim 9 wherein the provided change information is configured for use by the storage system to clone the at least a portion of the source logical storage device changed by the submitted input-output operation to the target logical storage device based at least in part on a determination by the storage system that the source logical storage volume was already migrated to the target logical storage volume.

15. A computer program product comprising a non-transitory processor-readable storage medium having stored therein program code of one or more software programs, wherein the program code, when executed by a host device comprising a processor coupled to a memory and configured to communicate over a network with a storage system, causes the host device:

to obtain a write input-output operation for submission to the storage system;

to determine that the write input-output operation corresponds to a source logical storage device of the storage system;

to determine that the source logical storage device is being migrated to a target logical storage device of the storage system;

to generate change information based at least in part on the write input-output operation, the change information comprising an indication of at least a portion of the source logical storage device to be changed by a submission of the write input-output operation to the storage system;

to submit the write input-output operation to the storage system; and to provide the change information to the storage system, the provided change information being configured for use by the storage system to clone the at least a portion of the source logical storage device changed by the submitted input-output operation to the target logical storage device.

16. The computer program product of claim 15 wherein:

the storage system comprises a first storage array comprising the source logical storage device and a second storage array comprising the target logical storage device;

submitting the write input-output operation to the storage system comprises submitting the write input-output operation to the first storage array; and providing the change information to the storage system comprises providing the change information to at least one of the first storage array and the second storage array.

17. The computer program product of claim 16 wherein providing the change information to the at least one of the first storage array and the second storage array comprises one of:

providing the change information to the first storage array, the provided change information being configured for use by the first storage array to clone the at least a portion of the source logical storage device changed by the submitted input-output operation to the target logical storage device, the cloning comprising pushing, by the first storage array, the at least a portion of the source logical storage device from the first storage array to the second storage array based at least in part on the provided change information; and providing the change information to the second storage array, the provided change information being configured for use by the second storage array to clone the at least a portion of the source logical storage device changed by the submitted input-output operation to the target logical storage device, the cloning comprising pulling, by the second storage array, the at least a portion of the source logical storage device from the first storage array to the second storage array based at least in part on the provided change information.

18. The computer program product of claim 15 wherein:

generating the change information based at least in part on the write input-output operation comprises generating the change information based at least in part on a plurality of write input-output operations obtained by the host device;

submitting the write input-output operation to the storage system comprises submitting the plurality of write input-output operations to the storage system;

the program code further causes the host device to determine that a threshold criterion for providing the change information to the storage system has been met; and providing the change information to the storage system comprises providing the change information to the storage system based at least in part on the determination that the threshold criterion for providing the change information to the storage system has been met.

19. The computer program product of claim 15 wherein determining that the threshold criterion for providing the change information to the storage system has been met comprises determining that at least one of:

a threshold amount of time has elapsed since a prior submission of change information to the storage system; and a threshold number of write input-output operations have been submitted to the storage system since a prior submission of change information to the storage system.

20. The computer program product of claim 15 wherein the provided change information is configured for use by the storage system to clone the at least a portion of the source logical storage device changed by the submitted input-output operation to the target logical storage device based at least in part on a determination by the storage system that the source logical storage volume was already migrated to the target logical storage volume.

* * * * *